May 4, 1954 H. N. BROYLES 2,677,425

TAPE DISPENSER

Filed March 25, 1950

INVENTOR.
HORACE N. BROYLES

BY Alfred W. Petchaft

ATTORNEY

Patented May 4, 1954 2,677,425

UNITED STATES PATENT OFFICE 2,677,425

TAPE DISPENSER

Horace N. Broyles, St. Louis, Mo.

Application March 25, 1950, Serial No. 151,982

6 Claims. (Cl. 164—84.5)

This invention relates to certain new and useful improvements in adhesive tape dispensers.

The primary object of the present invention is to provide a dispenser for tape presented in roll or spool form and being freely disposed upon the spool for movement thereabout in guiding tape lengths withdrawn therefrom.

It is a further object of the present invention to provide a tape dispenser of the type stated which will not be unauthorizedly displaced from the tape roll by usage, but is adapted to be readily removed, when the tape has been completely utilized, for use with a new roll.

It is an additional object of the present invention to provide a tape dispenser of the type stated which incorporates means for severing tape lengths at the desired point and which are adapted for relatively rigid positionment during severing action.

It is a still further object of the present invention to provide a tape dispenser of the type stated which includes means for supporting the free end of the tape and means for readily permitting gripping of the same in order to withdraw a length of tape from the roll.

It is an additional object of the present invention to provide a tape dispenser so fabricated that it may be progressively reduced in cross-sectional area, in order to accommodate the spool as the tape is used.

It is another object of the present invention to provide a tape dispenser of the type stated which is most economical in fabrication and highly durable.

With the above and other objects in view, my invention resides in the novel features of form, construction, arrangement, and combination of parts presently described and pointed out in the claims.

In the accompanying drawing (one sheet)—

Figure 1:
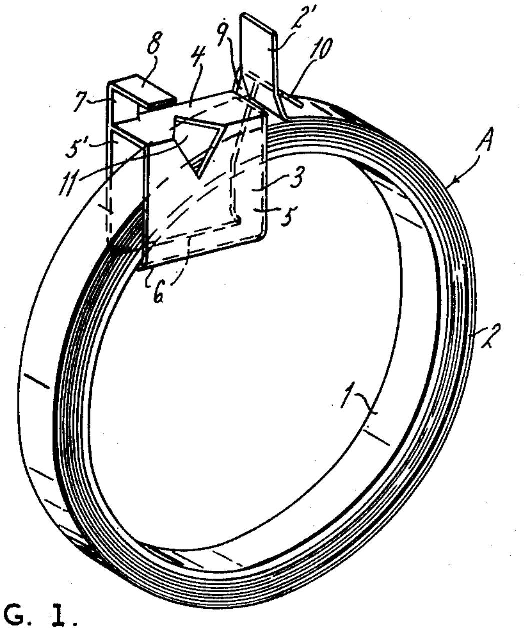
Figure 1 is a perspective view of a tape dispenser constructed in accordance with and embodying the present invention.

Referring now by reference characters to the drawing which illustrates practical embodiments of the present invention, A designates generally a spool having a conventional hub or a tubular core section 1, fabricated preferably of laminated paper or cardboard, and adhesive tape 2, preferably of the transparent pressure-sensitive type, commonly called "Scotch tape," wound thereon in the customary manner. Freely disposed upon the spool A is a dispensing member 3, fabricated of a suitable plastic, sheet-metal stock, or the like, comprising a web or central plate 4 which is slightly wider than the width of the tape 2, and having its under face adjacent the outer peripheral face of the tape 2. Integrally formed with the web 4 are depending, parallel side plates 5, 5′, of generally rectangular form and slightly greater in length than the combined thicknesses of an unused roll of tape 2 and the hub 1. At their lower ends the plates 5, 5′, are bent inwardly, as at 6, for extension within the opening defined by the hub 1 to prevent unauthorized displacement of the dispenser 3 from the spool A during usage. Adjacent its upper rearward margin the plate 5′ is provided with an upwardly projecting arm 7, the upper end of which is integral with a transversely extending arm 8 disposed in spaced parallel relation to the web 4. Adjacent its upper, forward margin the side plate 5′ is integrally provided with an upwardly inclined arm 9 which projects forwardly beyond the forward margin of said plate 5′ and at its upper end is integral with a transverse arm 10, the axis of which is normal to the axis of the arm 9. Said arm 10 is thus spaced forwardly from the forward margin of the web 4 and is disposed in a plane angularly related to the plane of said web 4. Provided in the web 4 and the side plate 5 is a large, continuous aperture 11 for purposes appearing more fully hereinafter.

In use, the free end of the tape 2 is directed by the user under the arm 10 and lifted upwardly bringing the non-adhesive face thereof across its full width into bearing contact against the rearward margin of said arm 10 (see Figure 1). Thereupon, the user pulls the free end of the tape 2 upwardly and rearwardly until the desired length 2′ thereof is reached. During this operation the dispenser 3 is pulled freely and smoothly about the spool A in following the length of tape 2′ being withdrawn from the spool A. It will be seen that the tape length is guided by the arm 10 without the development of any distortion or undesired entanglement.

Figure 2:
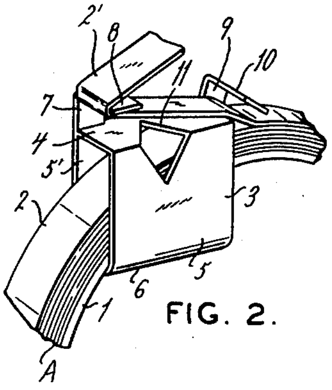
Figure 2 is a fragmentary perspective view illustrating the tape dispenser disposed for severing the length of the tape.

The user then pulls the free end of the tape length 2′ selected laterally outwardly and then inwardly beneath the transverse arm 8, (see Figure 2), and positions the region of said tape length 2′ corresponding to the desired end thereof against the rear transverse margin of the arm 8, and severs same thereagainst. In so severing the tape length 2′, the user will necessarily exert a pulling force against the arm 8 which will cause the dispenser 3 to rock forwardly, bringing the rear edges of the lower bent ends of the plates 5, 5′, against the inner face of the hub 1, thereby maintaining the dispenser 3 in relatively rigid position for the tape cutting procedure. After severance, the free end of the remaining portion of the tape 2 will drop downwardly onto the upwardly presented face of the web 4. When a second or additional length of tape 2 is desired, the user need merely insert the thumb into the aperture 11 whereby the tape 2 may be readily gripped and freed from contact with the web 4 by upward lifting movement. Thus, there is obviated the necessity of laboriously trying to pry off the free end of the tape, which in currently used rolls, will have normally adhered to the underlying layer. After all of the tape 2 on the spool A is utilized the dispenser 3 may be removed from the empty hub 1, for use on a new spool, by springing the side plates 5, 5′, outwardly and lifting the dispenser 2 therefrom.

Figures 3, 4:
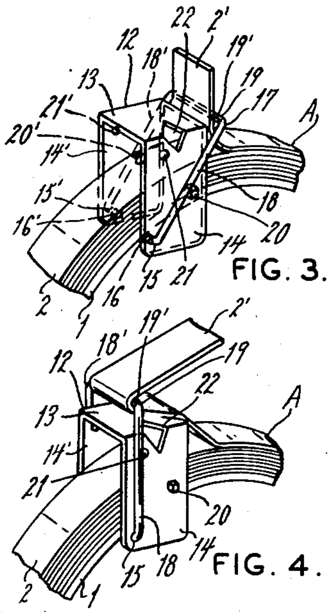
Figure 3 is a fragmentary perspective view of a modified tape dispenser constructed in accordance with and embodying the present invention.
Figure 4 is a fragmentary perspective view of the modified tape dispenser in position for tape severing action.
Figure 5:
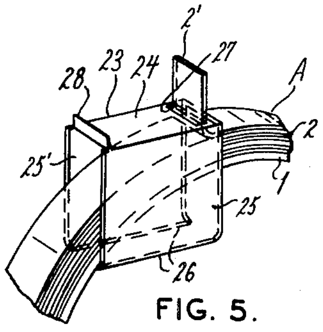
Figure 5 is a fragmentary perspective view of a further modified tape dispenser constructed in accordance with and embodying the present invention.
Figure 6:
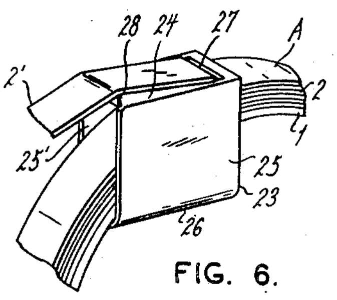
Figure 6 is a fragmentary perspective view showing the further modified tape dispenser in position for severing the tape.

If desired, a modified tape dispenser 12 may be provided having a web or central plate 13 and depending relative parallel side plates 14, 14′. Adjacent the lower rearward ends of each of the plates 14, 14′, there is provided aligned apertures 15, 15′, respectively, through which loosely extend the lower, inwardly bent ends 16, 16′, of a generally U-shaped arm 17, said ends 16, 16′, projecting within the area defined by the hub 1 to prevent unauthorized displacement of the dispenser 12 from the spool A during usage. The arm 17 is integrally provided with side legs 18, 18′, disposed in outwardly spaced relation to the side plates 14, 14′, respectively, and projecting at their upper ends beyond the upper face of the web 13, and being connected by a transverse, central bar 19, which is, thus, in spaced relation to said web 13. The rearward transverse margin of the central bar 19 is beveled to provide a cutting edge 19′ for purposes appearing more fully hereinafter. The arm 17 is thereby disposed for swinging movement about its lower ends with the forward limit of such movement being determined by detent lugs 20, 20′, integrally formed in and projecting outwardly from the outer faces of the side plates 14, 14′, respectively, adjacent their forward central margins (see Figure 3). Upon rearward swinging movement the arm 17 will be forcibly slid over detent projections 21, 21′, formed in the side plates 14, 14′, respectively, adjacent their upper rearward margins. Thereby, the arm 17 will be prevented from swinging forwardly and be maintained in substantially vertical position, as may be seen in Figure 4. Formed in the web 13 and the side plate 14, is an enlarged continuous aperture 22.

In use, the arm 17 is swung to its forward position, and the free end of the tape 2 is led between the central bar 19 thereof, and the forward margin of the web 13 with the non-adhesive face of the tape 2 brought into bearing contact, across its full width, against the rearward margin of said bar 19. The user then pulls the free end of the tape 2 with an upwardly and rearwardly directed force until the desired length 2′ has been withdrawn from the spool A. During this pulling operation the dispenser 12 is moved freely and smoothly about the spool A in following the length of tape 2, which is being peeled therefrom. The arm 17 is then swung forwardly along the tape length 2′ into vertical position being maintained therein by the detents 21, 21′, and the tape length 2′ is severed or torn against the cutting edge 19′ of the central bar 19. The arm 17 is prevented from swinging forwardly under pressure of the force applied by the user in severing the tape length 2′, by the detents 21, 21′. The inwardly bent ends 16, 16′, of the arm 17, are brought into abutting engagement with the inner face of the hub 1 by the forward rocking of the dispenser 12 under the severing pressure exerted and thus maintains the dispenser 12 in relatively rigid position for the cutting action. After the selected tape length 2′ has been severed, the free end remaining will tend to drop downwardly on the upwardly presented face of the web 13, from which it may be easily lifted, by the insertion of the user's thumb into aperture 22 for subsequent dispensing. When the tape 2 upon the spool A has been completely utilized, the dispenser 12 may be removed from the now empty hub 1 by springing the legs 18, 18′, of the arm 17 outwardly and then lifting the dispenser 12 upwardly.

If desired, a further modified type of tape dispenser 23 is provided having a central web 24 and depending side plates 25, 25′, the lower margins of which are bent inwardly as at 26 in the manner of the plates 5, 5′, of the dispenser 3 above described. Adjacent its forward margin the web 24 is provided with a transversely extending aperture 27, and adjacent its rearward margin it is provided with a transversely extending upturned flap or flange 28.

In use, the free end of the tape 2 is threaded upwardly through the aperture 27 with the non-adhesive face of the tape 2 bearing against the forward transverse margin thereof. The tape 2 is then pulled upwardly and rearwardly until the selected length 2′ has been withdrawn from the spool A. The dispenser 23 will move freely about the periphery of the tape 2 during such action in following the tape length 2′ being freed. The tape length 2′ is led forwardly across the upwardly presented face of the web 24 and the region thereof corresponding to the desired end is disposed upon the flange 28 whereupon the user by downward pressure severs the tape length 2′ thereagainst. The free end of the tape 2 then remaining will tend to remain upon the flange 28 by adhesion of its underface thereto and, thus, by being elevated above the web 24 will permit the user to easily grip same for the next operation.

Figure 7:
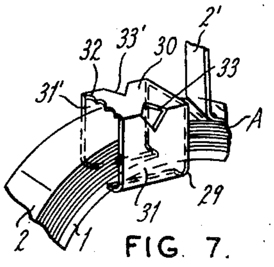
Figure 7 is an additionally modified tape dispenser constructed in accordance with and embodying the present invention.
Figure 8:
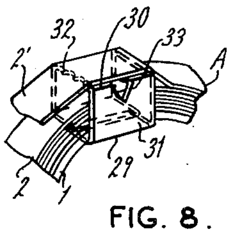
Figure 8 is a fragmentary perspective view showing the additionally modified tape dispenser, in position for severance of the tape, and with the side plates bent to accommodate the partially used roll.

Finally, if desired, an additionally modified type of tape dispenser 29 may be provided, reference being made to Figures 7 and 8, which comprises a web or central plate 30 and depending side plates 31, 31', the lower ends of which are bent inwardly in the manner of the plates 5, 5', of the dispenser 3 above described. The dispenser 29 is fabricated of relatively thin, easily bendable sheet stock in order that the side plates 31, 31', may be progressively bent inwardly at their lower ends as the tape 2 is utilized to keep the web 30 in substantially close adjacency to the outer periphery of the tape 2 (see Figure 8). On its forward transverse margin the web 30 is serrated to provide cutting teeth 32, and is centrally provided on its longitudinal margins with aligned apertures 33, 33', which extend into the side plates 31, 31', respectively.

In use, the desired length of tape 2' is withdrawn from the spool A after which the dispenser 29 is manually moved about the spool A until it abuts against the tape length 2' at the point of its connection to the spool A. Thereupon the tape length 2' is led across the web 30 with the desired end thereof disposed against the teeth 32 and is severed thereagainst. The free end of the tape 2 remaining will, thus, be disposed upon the upper face of the web 32 and be readily lifted therefrom by use of the apertures 33, 33'.

It should be understood that changes and modifications in the form, construction, arrangement, and combination of the several parts of the tape dispenser may be made and substituted for those herein shown and described without departing from the nature and principle of my invention.

Having thus described my invention what I claim and desire to secure by Letters Patent is:

1. A tape dispenser for use with tape presented upon a spool having a hub comprising a flat, rectangular web portion for disposition upon the outer layer of the tape, plate-like sections depending downwardly from opposite side margins of the web and having a width equivalent to the length of the web, said plate-like sections having their lower ends bent inwardly toward each other for projection into the hub, said bent lower ends being spaced apart a distance less than the thickness of the hub, the distance between said plate-like sections upwardly of said bent lower ends being greater than the width of the tape on the spool so that the dispenser may be freely movable along the tape, a first support arm secured to said dispenser and extending upwardly and outwardly beyond the web portion for projection beyond the rearward end thereof, a tape guiding arm connected to the first support arm for presentation in spaced relation to the rearward end of the web portion, a second support arm disposed adjacent one side margin of the web portion proximate the forward end thereof for projection upwardly beyond the upper surface of the web portion, and a tape cutting arm connected to said second support arm spacedly above the web portion for overlying projection with respect thereto.

2. A tape dispenser of the type described in claim 1 wherein said second support arm is provided on one of said plate-like sections adjacent the forward end of the web portion for upward vertical projection therebeyond, and the tape cutting arm extends inwardly from the upper portion of said second support arm, the extent of said tape cutting arm being at least as great as the width of said web portion.

3. A tape dispenser of the type described in claim 1 wherein the tape cutting arm is presented in planar parallel relation to the web portion so that when tape is presented thereagainst for cutting the dispenser will be rocked rearwardly causing the forward end margins of the plate-like sections to abut against the hub for maintaining the dispenser in relatively rigid position during the tape cutting action.

4. A tape dispenser of the type described in claim 1 wherein the tape guiding arm is upwardly of the rearward end of the web portion, and the forward edge of said tape guiding arm is parallel to the rearward margin of said web portion.

5. A tape dispenser of the type described in claim 1 wherein the first support arm projects upwardly and rearwardly from one plate-like section beyond the rearward end of the web portion, and the tape guiding arm is normal to the first support arm and the plane thereof forms an angle of less than 90° with the plane of the web portion.

6. A tape dispenser of the type described in claim 1 wherein the first and second support arms are provided on the same plate-like section for projection beyond the web portion and the tape cutting arm and tape guiding arm are free at their outer ends.

References Cited in the file of this patent

UNITED STATES PATENTS

| Number | Name | Date |
|---|---|---|
| 1,821,947 | Ross | Sept. 8, 1931 |
| 2,203,073 | Anderson | June 4, 1940 |
| 2,272,628 | Anderson | Feb. 10, 1942 |
| 2,284,807 | Donahoo et al. | June 2, 1942 |
| 2,295,477 | Jackson | Sept. 8, 1942 |
| 2,401,286 | Wright | May 28, 1946 |
| 2,528,958 | Johnson | Nov. 7, 1950 |
| 2,609,877 | Haington | Sept. 9, 1952 |